(12) United States Patent
Lim

(10) Patent No.: US 9,939,853 B2
(45) Date of Patent: Apr. 10, 2018

(54) APPARATUS AND METHOD FOR CONTROLLING CONTROLLABLE DEVICE IN PORTABLE TERMINAL

(71) Applicant: Samsung Electronics Co., Ltd, Gyeonggi-do (KR)

(72) Inventor: Hun Lim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 411 days.

(21) Appl. No.: 13/667,906

(22) Filed: Nov. 2, 2012

(65) Prior Publication Data

US 2013/0113699 A1    May 9, 2013

(30) Foreign Application Priority Data

Nov. 3, 2011  (KR) .................. 10-2011-0113852

(51) Int. Cl.
*G06F 1/16* (2006.01)
*H04L 12/28* (2006.01)
(Continued)

(52) U.S. Cl.
CPC ............ *G06F 1/1694* (2013.01); *G06F 3/017* (2013.01); *G06F 3/0486* (2013.01);
(Continued)

(58) Field of Classification Search
CPC . G06F 3/01; G06F 3/14; G06F 3/1423; G06F 3/1454; G06F 3/048; G06F 3/0481;
(Continued)

(56) References Cited

U.S. PATENT DOCUMENTS 6,603,488 B2   8/2003  Humpleman et al.
6,801,507 B1  10/2004  Humpleman et al.
(Continued)

FOREIGN PATENT DOCUMENTS

EP           2068236 A1   6/2009
KR       10-2011-0071301   6/2011
WO      WO 2011021871 A2   2/2011

OTHER PUBLICATIONS

International Search Report dated Mar. 26, 2013 in connection with International Patent Application No. PCT/KR2012/009153, 3 pages.
(Continued)

*Primary Examiner* — Nelson Rosario

(57) ABSTRACT

An apparatus and method control a controllable device in a portable terminal. The apparatus includes a device register unit, an input unit, a memory unit, a gesture detector, a controller, and a contents transmitter. The device register unit registers controllable devices to partial regions of an output screen. The input unit generates input data for controllable device registration or user's input data for controllable device selection. The memory unit stores information of the controllable devices registered by the device register unit. The gesture detector senses a user's input capable of determining direction. The controller detects a controllable device corresponding to the user's input. The contents transmitter transmits contents to the controllable device detected by the controller.

20 Claims, 10 Drawing Sheets

(51) Int. Cl.
    *G06F 3/01*     (2006.01)
    *G06F 3/0486*     (2013.01)
    *G06F 3/0488*     (2013.01)

(52) U.S. Cl.
    CPC ...... *G06F 3/04883* (2013.01); *G06F 3/04886* (2013.01); *H04L 12/282* (2013.01)

(58) Field of Classification Search
    CPC .... G06F 3/04815; G06F 1/1694; G06F 3/017; G06F 3/0486; G06F 3/04883; G06F 3/04886; H04L 12/282
    USPC ............................ 345/2.2; 715/716; 455/556
    See application file for complete search history.

(56) References Cited

U.S. PATENT DOCUMENTS

| | | | |
|---|---|---|---|
| 7,831,930 | B2 | 11/2010 | Dresti et al. |
| 8,547,342 | B2 | 10/2013 | Stallings et al. |
| 8,884,886 | B2 | 11/2014 | Bonczek et al. |
| 2001/0038392 | A1 | 11/2001 | Humpleman et al. |
| 2003/0103088 | A1* | 6/2003 | Dresti ................... G06F 3/0481 715/835 |
| 2006/0294247 | A1* | 12/2006 | Hinckley et al. ............. 709/228 |
| 2007/0124503 | A1* | 5/2007 | Ramos et al. ................ 709/248 |
| 2008/0214233 | A1* | 9/2008 | Wilson et al. ............. 455/556.1 |
| 2009/0100199 | A1 | 4/2009 | Lim et al. |
| 2009/0303197 | A1 | 12/2009 | Bonczek et al. |
| 2010/0082784 | A1* | 4/2010 | Rosenblatt .......... H04L 12/2812 709/222 |
| 2010/0134338 | A1* | 6/2010 | Belz et al. .................... 341/176 |
| 2010/0138797 | A1 | 6/2010 | Thorn |
| 2010/0156812 | A1* | 6/2010 | Stallings ............. G06F 3/04883 345/173 |
| 2011/0001686 | A1* | 1/2011 | Belvin et al. .................. 345/2.2 |
| 2011/0035691 | A1 | 2/2011 | Kim |
| 2011/0047493 | A1 | 2/2011 | Sung et al. |
| 2011/0078573 | A1* | 3/2011 | Ooba .................... G06F 9/4443 715/733 |
| 2011/0136441 | A1 | 6/2011 | Son et al. |
| 2011/0193879 | A1 | 8/2011 | Kim et al. |
| 2012/0131458 | A1* | 5/2012 | Hayes .......................... 715/716 |
| 2012/0146884 | A1* | 6/2012 | Wang et al. ................... 345/2.2 |

OTHER PUBLICATIONS

Written Opinion of the International Searching Authority dated Mar. 26, 2013 in connection with International Patent Application No. PCT/KR2012/009153, 4 pages.

Extended European Search Report dated May 18, 2015 in connection with European Patent Application No. 12845633.2; 12 pages.

Foreign Communication from Related Counterpart Application; European Patent Application No. 12845633.2; Communication Pursuant to Article 94(3) EPC dated Jul. 20, 2017; 8 pages.

Foreign Communication from Related Counterpart Application; Korean Patent Application No. 10-2011-0113852; Notice of Patent Grant dated Aug. 22, 2017; 3 pages.

\* cited by examiner

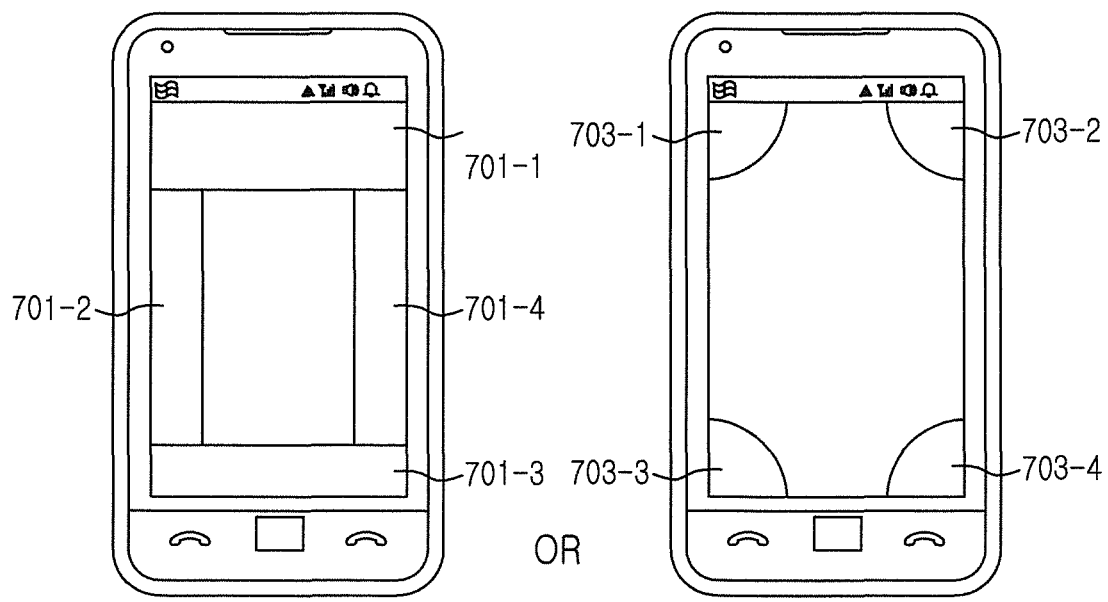
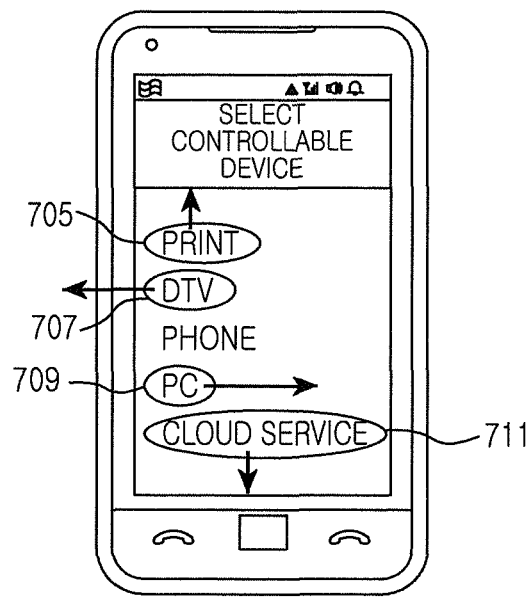 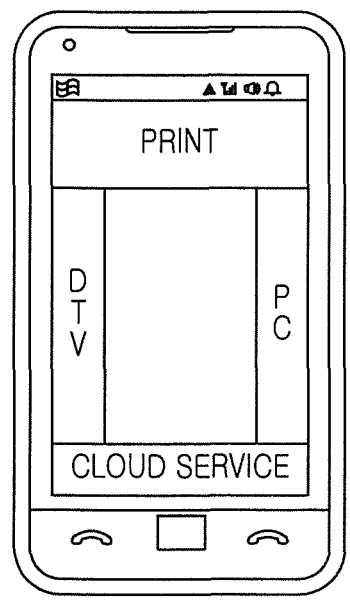
FIG.7A
FIG.7B    FIG.7C

APPARATUS AND METHOD FOR CONTROLLING CONTROLLABLE DEVICE IN PORTABLE TERMINAL

CROSS-REFERENCE TO RELATED APPLICATION(S) AND CLAIM OF PRIORITY

The present application is related to and claims priority under 35 U.S.C. § 119(a) to a Korean Patent Application filed in the Korean Intellectual Property Office on Nov. 3, 2011 and allotted Serial No. 10-2011-0113852, the contents of which are herein incorporated by reference.

TECHNICAL FIELD OF THE INVENTION

The present disclosure relates to an apparatus and method for selecting a peripheral device within a network for the sake of contents transmission in a portable terminal.

BACKGROUND OF THE INVENTION

In recent years, portable terminals are in trend of the sudden spread of use because of the convenience of carrying. Accordingly, service providers (i.e., system manufacturers) are competitively developing portable terminals having more convenient functions to guarantee many users.

For example, the portable terminals are providing functions of phone books, games, schedulers, Short Message Services (SMSs), Multimedia Message Services (MMS), Broadcast Message Services (BMSs), Internet services, electronic mail (e-mail) messages, morning wakeup calls, MPEG-1 Audio Layer 3 (MP3), digital cameras, etc.

As a function of the portable terminal gets diversified and complicated, a use method thereof gets complicated too. So, users require more intuitive interface capable of using the diversified and complicated function of this digital device simply and conveniently.

Further, with the miniaturization and mobility of the portable terminals, the frequency of outdoor use of the portable terminals is increasing. This results from the growth of wireless communication functions of the portable terminals. That a user provides data stored in the portable terminal to an inter-workable peripheral device often occurs.

This means that the user intends to have the inter-workable peripheral device play the data of the portable terminal. The portable terminal transmits image data being playing to a peripheral device, which exists around, such as a TeleVision (TV), a Personal Computer (PC) and the like, so that the peripheral device can continuously play the image data.

As know in the art, to perform the above function, the portable terminal performs a process of selecting contents intended to play from a list of contents and then, searching for peripheral devices. After that, the portable terminal has to perform a process of selecting a peripheral device intending to play the selected contents from a list of the searched peripheral devices.

That is, the portable terminal performs a process of selecting contents intended to play and a target peripheral device from a list of contents and a list of peripheral devices, respectively. But, there can be troubles in selecting a peripheral device wanted by a user.

Accordingly, to provide a solution to the above problem, an apparatus and method for quickly and conveniently selecting a peripheral device for contents playing in a portable terminal are needed.

SUMMARY OF THE INVENTION

To address the above-discussed deficiencies of the prior art, it is a primary object to provide at least the advantages below. Accordingly, one aspect of the present disclosure is to provide an apparatus and method for sensing a user's input for contents and detecting a controllable device in a portable terminal.

Another aspect of the present disclosure is to provide an apparatus and method for registering controllable devices to partial regions of an output screen in a portable terminal.

A further aspect of the present disclosure is to provide an apparatus and method for changing information of a pre-registered controllable device according to location change in a portable terminal.

Yet another aspect of the present disclosure is to provide an apparatus and method for, by dragging contents or shaking a portable terminal to the direction of a pre-registered controllable device, transmitting the contents to the controllable device in the portable terminal.

The above aspects are achieved by providing an apparatus and method for controlling a controllable device in a portable terminal.

According to one aspect of the present disclosure, an apparatus for controlling a controllable device in a portable terminal is provided. The apparatus includes a device register unit, an input unit, a memory unit, a gesture detector, a controller, and a contents transmitter. The device register unit registers controllable devices to partial regions of an output screen. The input unit generates input data for controllable device registration or user's input data for controllable device selection. The memory unit stores information of the controllable devices registered by the device register unit. The gesture detector senses a user's input capable of determining direction. The controller detects a controllable device corresponding to the user's input. The contents transmitter transmits contents to the controllable device detected by the controller.

According to another aspect of the present disclosure, a method for controlling a controllable device in a portable terminal is provided. The method includes registering controllable devices to partial regions of an output screen, sensing a user's input capable of determining direction, detecting a controllable device corresponding to the user's input, and transmitting contents to the detected controllable device.

According to a further aspect of the present disclosure, an electronic device includes one or more processors for executing computer programs, a memory for storing data and instructions, and one or more modules stored in the memory and constructed to be executed by the one or more processors. The module includes instructions of registering controllable devices to partial regions of an output screen, sensing a user's input capable of determining direction, detecting a controllable device corresponding to the user's input, and transmitting contents to the detected controllable device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation: the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A-C illustrate a process of registering a controllable device in a portable terminal according to a desirable exemplary embodiment of the present disclosure;

DETAILED DESCRIPTION OF THE INVENTION

FIGS. 1 through 9C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Preferred embodiments of the present disclosure will be described herein below with reference to the accompanying drawings. In the following description, well-known functions or constructions are not described in detail since they would obscure the invention in unnecessary detail.

The following description is made for an apparatus and method for, after sensing a user's input capable of determining direction and detecting a controllable device, transmitting contents being playing to the controllable device in a portable terminal according to an exemplary embodiment of the present disclosure. Further, the portable terminal, which is a portable electronic device, can be a mobile phone, a media player, a tablet computer, a handheld computer, a Personal Digital Assistant (PDA) and the like. Also, the portable terminal can be an arbitrary portable electronic device including a device having a combination of two or more functions among these devices.

Figure 1:
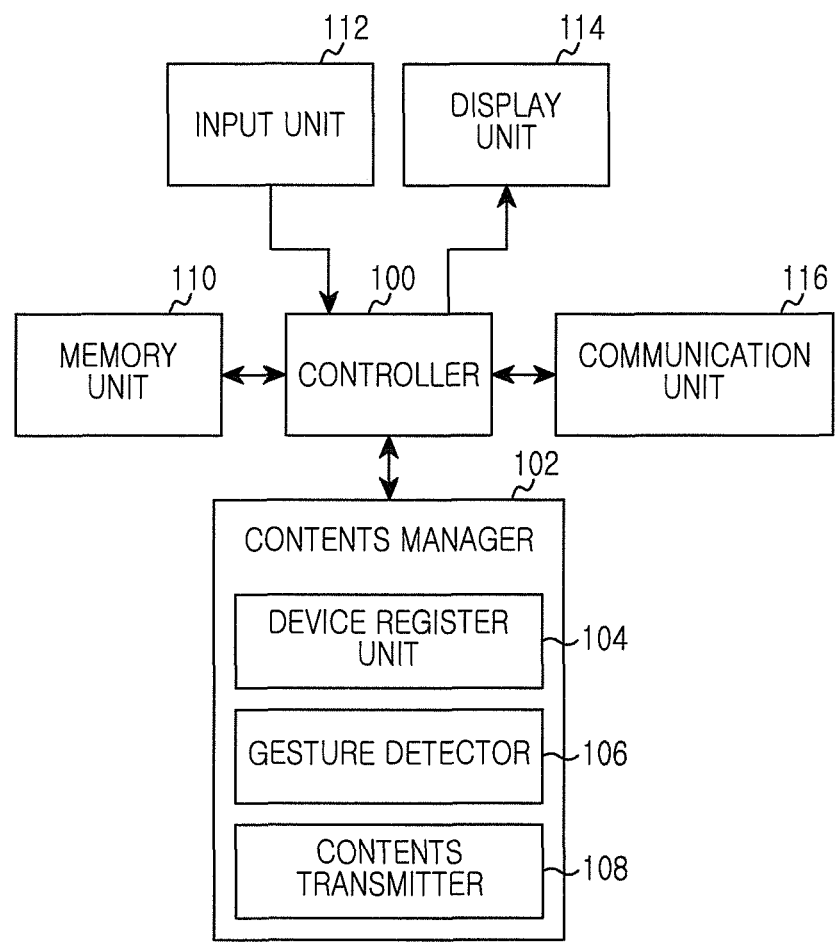
FIG. 1 illustrates a block diagram of a portable terminal controlling a controllable device according to the present disclosure.

FIG. 1 illustrates a block diagram of a portable terminal controlling a controllable device according to the present disclosure.

Referring to FIG. 1, the portable terminal can include a controller 100, a contents manager 102, a memory unit 110, an input unit 112, a display unit 114, and a communication unit 116. The contents manager 102 can include a device register unit 104, a gesture detector 106, and a contents transmitter 108.

The controller 100 of the portable terminal controls the general operation of the portable terminal. For example, the controller 100 performs processing and control for voice call and data communication. In addition to a general function, according to the present disclosure, the controller 100 processes to register a controllable device intended to be controlled onto an output screen. Here, the controllable device is a peripheral device for sharing contents of the portable terminal. The contents are contents stored in the portable terminal or being playing, and represent data (e.g., multimedia contents, document data, etc.) playable in a controllable device.

Further, the controller 100 processes to sense a user's input capable of determining direction and move or copy contents to a controllable device. Here, the user's input includes drag-and-drop of contents, throwing of contents, a gesture of a state of holding the portable terminal in hand and the like.

Under the control of the controller 100, the contents manager 102 processes to play contents using a controllable device.

At this time, the contents manager 102 registers controllable devices playing contents, analyzes a user's input to detect a controllable device that a user intends to control, and moves or copies contents to the detected controllable device.

The device register unit 104 of the contents manager 102 processes to register the controllable device that the user intends to control, onto the output screen.

That is, the device register unit 104 allots partial regions of the output screen as controllable device register regions and then, according to a user's request, registers controllable devices to the controllable device register regions. For one example, after setting the partial regions of the output screen such as up, down, left, and right sides of the output screen as the controllable device register regions, the device register unit 104 can register controllable devices to the respective partial regions. And, the device register unit 104 can register information of the registered controllable devices, such as a controllable device name, a controllable device serial number, a controllable device kind, a network address, a service kind, an Internet Protocol (IP) address and the like. For one example, if the device register unit 104 searches for controllable devices through Universe Plug and Play (UPnP), the device register unit 104 can register controllable device information such as information of a Unique Device Name (UDN) within the UPnP, a friend name, a Model Description, an IP address and the like. At this time, the device register unit 104 can store, together, even location information of the portable terminal having registered the controllable devices (e.g., a latitude and longitude (Global Positioning System (GPS)), cell information (i.e., a cell IDentifier (ID)), a Service Set IDentifier (SSID) (i.e., wireless Access Point (AP) information), an IP address (i.e., a network address) and the like) to distinguish pre-registered controllable devices according to a location change of the portable terminal.

The gesture detector 106 of the contents manager 102 senses a user's input capable of determining direction, such as drag-and-drop and throwing (i.e., touch-and-move). Further, the gesture detector 106 can include a sensor for sensing, information acquisition, which is used for detecting a motion of the portable terminal. The gesture detector 106 detects a user gesture of a state of holding the portable terminal in hand using sensing, information acquired from the sensor. At this time, when the gesture detector 106 detects a gesture to the right side, the contents manager 102 processes to transmit contents to a controllable device registered to the right side.

The contents transmitter 108 of the contents manager 102 processes to transmit contents being playing or contents previously stored, to a controllable device corresponding to a user's input. At this time, after acquiring stored controllable device information of a direction corresponding to the user's input from the device register unit 104 and performing a process of communication connection with a controllable device, the contents transmitter 108 can move or copy contents according to a communication scheme of the controllable device. For example, when the gesture detector 106 senses a user's input to the right direction, the contents transmitter 108 can move or copy contents to a controllable device registered to the right direction of the portable terminal.

Operations of the controller 100 and the contents manager 102 can be executed by a specific software module (i.e., a set of instructions) stored in the memory unit 110. At this time, the software module can be executed by the controller 100.

That is, the operations of the controller 100 and the contents manager 102 can be configured in software or hardware. Also, the elements of the contents manager 102 can be defined as respective controllers. Further, the controller 100 can be defined as a processor, and the contents manager 102 can be defined as another processor.

The memory unit 110 is composed of a Read Only Memory (ROM), a Random Access Memory (RAM), and a flash ROM. The ROM stores a microcode of a program for processing and controlling the controller 100 and the contents manager 102 and a variety of reference data. The ROM stores a list of controllable devices registered by the contents manager 102 and location information of a spot having registered the controllable device according to a desirable exemplary embodiment of the present disclosure.

The RAM, a working memory of the controller 100, stores temporary data generated in execution of a variety of programs. The flash ROM stores a diversity of updateable depository data such as a phone book, an outgoing message, and an incoming message.

Further, the memory unit 110 stores a software module in order to perform operations of the controller 100 and the contents manager 102 according to the present disclosure.

The input unit 112 includes numeral key buttons '0' to '9', a menu button, a cancel button, an OK button, a talk button, an end button, an Internet button, navigation key (or direction key) buttons, and a plurality of function keys such as a character input key and the like. The input unit 112 provides key input data corresponding to a key pressed by a user, to the controller 100. According to the present disclosure, the input unit 112 generates a user's input for registering a controllable device and a user's input for selecting the registered controllable device. Here, the user's input for selecting the controllable device, which is a user's input capable of determining direction, includes touch-and-move of contents, drag-and-drop of contents, a gesture about the portable terminal and the like.

The display unit 114 displays status information generated during operation of the portable terminal, characters, a large amount of moving pictures and still pictures such as photographs, documents, etc. and the like. The display unit 114 can be a color Liquid Crystal Display (LCD), an Active-Matrix Organic Light-Emitting Diode (AMOLED) and the like. The display unit 114 includes a touch input device and, when being applied to the portable terminal of a touch input scheme, the display unit 114 can be used as an input device of the portable terminal.

The communication unit 116 performs a function of transmitting/receiving and processing a wireless signal of data input/output through an antenna (not shown). For example, at transmission, the communication unit 116 performs a function of processing original data through channel coding and spreading, converting the original data into a Radio Frequency (RF) signal, and transmitting the RF signal. At reception, the communication unit 116 performs a function of converting a received RF signal into a baseband signal, processing the baseband signal through de-spreading and channel decoding, and restoring the signal to original data. Besides, under the control of the controller 100, the communication unit 116 transmits contents to a controllable device confirmed by the contents manager 102. At this time, the communication unit 116 includes a communication module for contents transmission (e.g., a Bluetooth module, a Wireless Fidelity (WiFi) module, an infrared communication module and the like) and performs a predetermined communication process for connection with a controllable device.

A role of the contents manager 102 can be implemented by the controller 100 of the portable terminal. However, in the present disclosure, these are separately constructed and shown as an exemplary construction for description convenience, and never intend to limit the scope of the present disclosure. It will be understood by those skilled in the art that various modifications of construction can be made within the scope of the present disclosure. For example, construction may be such that all of these are processed in the controller 100. Further, an operation of each element constituting the portable terminal can be carried out by a software module.

Figure 2:
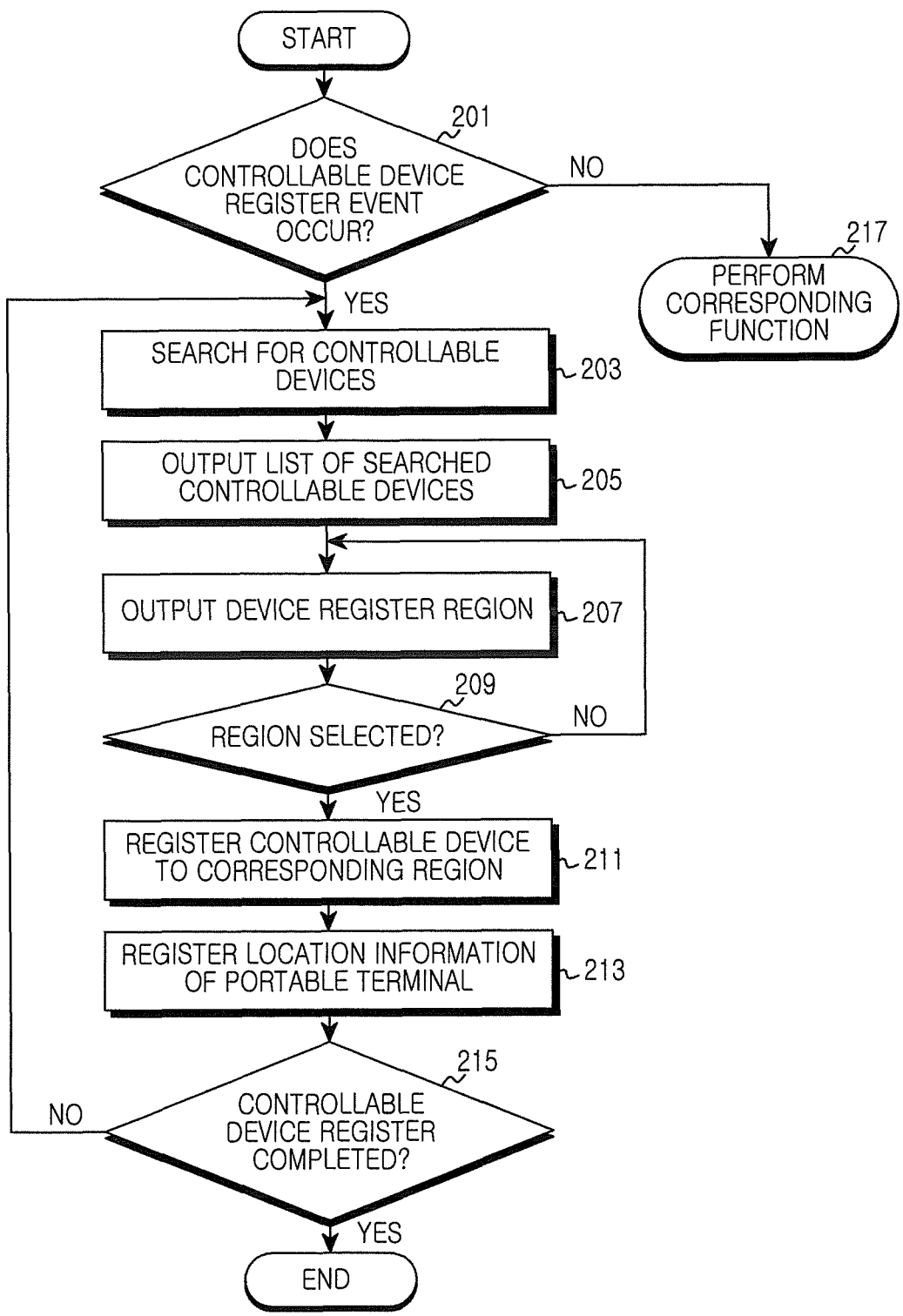
FIG. 2 illustrates a process of registering a controllable device in a portable terminal according to the present disclosure.

FIG. 2 illustrates a flowchart of a process of registering a controllable device in a portable terminal according to the present disclosure.

Referring to FIG. 2, the portable terminal can register controllable devices to partial regions of an output screen, and select and control the pre-registered controllable device through a user's input capable of determining direction. Here, the user's input capable of determining the direction includes touch-and-move of contents (e.g., throwing of contents), drag-and-drop of contents, a user gesture of a state of holding the portable terminal in hand and the like.

To register the controllable devices to the partial regions of the output screen, in step 201, the portable terminal checks if a controllable device registration event takes place. Here, as mentioned above, the controllable device registration event refers to an event of registering a peripheral device intended to be controlled, to part of the output screen.

If the portable terminal determines in step 201 that the controllable device registration event does not occur, the portable terminal proceeds to step 217 and performs a corresponding function (e.g., a sleep mode).

In contrast, if the portable terminal determines in step 201 that the controllable device registration event occurs, the portable terminal proceeds to step 203 and performs a controllable device search process. Here, the controllable device search process refers to a process of searching for connectable peripheral devices through a network supported in the portable terminal, and is to search for connected peripheral devices using a device search protocol of UPnP, Bonjour and the like, on media of Bluetooth, infrared communication, Wireless Local Area Network (WLAN) and the like.

After that, the portable terminal proceeds to step 205 and outputs a list of the controllable devices searched through the controllable device search process and then, receives a selection of the registered controllable device from a user.

Next, the portable terminal proceeds to step 207 and outputs a region to register the searched controllable device. Here, the region to register the controllable device is part of the output region of the portable terminal. The portable terminal can allot up, down, left and right regions or corner regions of the output screen, as the regions to register the controllable devices.

Further, the portable terminal can divide the output screen at a predetermined angle and then, allot the divided regions as the regions to register the controllable devices.

Further, the portable terminal can allot specific regions of the output screen selected from a user, as the regions to register the controllable devices.

After that, the portable terminal proceeds to step 209 and checks if the regions to register the controllable devices are selected from the user.

If the portable terminal determines in step 209 that the region to register the controllable device is not selected from the user, the portable terminal again performs a process of step 207.

In contrast, if the portable terminal determines in step 209 that the region to register the controllable device is selected from the user, the portable terminal proceeds to step 211 and registers the controllable device to the region selected from the user. Then, the portable terminal proceeds to step 213 and registers location information of the portable terminal. At this time, when registering the controllable device, the portable terminal can register controllable device information such as a controllable device name, a controllable device serial number, a controllable device kind, a network address, a service kind and the like, and can register location information such as a latitude and longitude (GPS), cell information (i.e., a cell ID), an SSID (i.e., wireless AP information), an IP address (i.e., a network address) and the like.

Further, the portable terminal registers a location of the portable terminal having registered the controllable device, and provides a list of controllable devices different according to use area. For one example, the portable terminal can register controllable devices, which are different by use area, to the same device register region such as registering a TV to an up region of an output screen in an area 'A' and registering a Personal Computer (PC) to the up region in an area 'B'.

Next, the portable terminal proceeds to step 215 and checks if the controllable device register process is completed.

If the portable terminal determines in step 215 that the controllable device register process is not completed, the portable terminal returns to step 203 and again performs the controllable device search process.

In contrast, if the portable terminal determines in step 215 that the controllable device register process is completed, the portable terminal terminates an algorithm according to the present disclosure.

In FIG. 2, a description has been made in which, after registering controllable devices to partial regions of an output screen, a portable terminal registers a controllable device intended to be controlled to the output screen through a user's input capable of detecting direction. Unlike this, after registering controllable devices to touch input instructions, the present disclosure can sense an instruction input by a user and register a controllable device intended to be controlled, to the output screen. For one example, after registering a PC to a form of the alphabet 'C' and registering a printer to a form of 'P', when sensing a user's touch input 'C' looking as if a user draws a picture on contents output to a touch panel, the portable terminal can be allowed to control the pre-registered PC. When sensing a user's touch input 'P' in the same manner, the portable terminal can be allowed to control the pre-registered printer.

A process of controlling a controllable device using a user's input capable of detecting direction is described below with reference to FIGS. 3 to 5.

Figure 3:
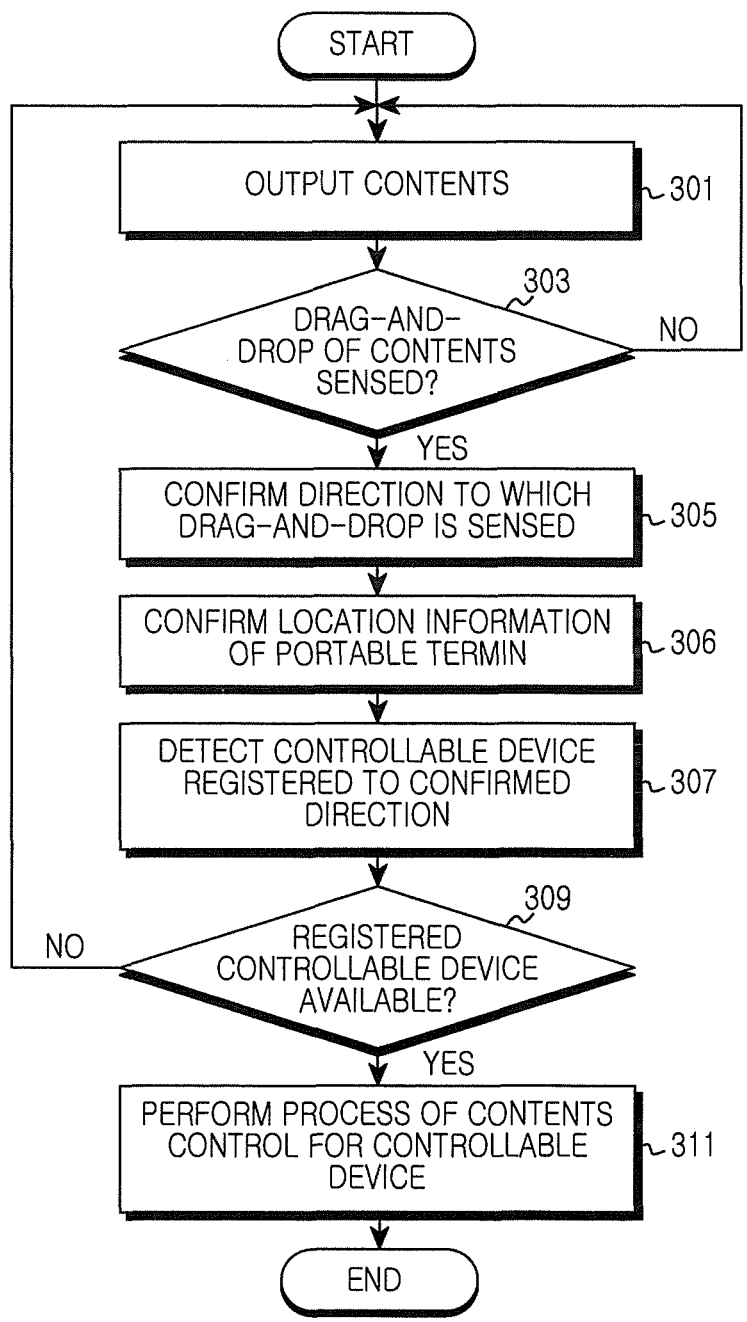
FIG. 3 illustrates a flowchart of a process of controlling a pre-registered controllable device in a portable terminal according to a desirable exemplary embodiment of the present disclosure.

FIG. 3 illustrates a flowchart of a process of controlling a pre-registered controllable device in a portable terminal according to a desirable exemplary embodiment of the present disclosure.

The portable terminal can sense a user's input capable of determining direction or a touch input instruction and control a pre-registered controllable device. In FIG. 3, a description is made for a process of sensing drag-and-drop of contents among user's inputs and controlling, a pre-registered controllable device. Here, the drag-and-drop of the contents refers to a user's input of dragging and dropping contents to a region to which a controllable device is registered.

First, in step 301, the portable terminal performs a process of outputting contents.

Here, the process of outputting the contents can include a process of outputting a list of contents that will be provided from a portable terminal to a controllable device and a process of playing the contents that will be provided to the controllable device. The portable terminal can transmit a plurality of contents simultaneously to the controllable device through the process of outputting the list of contents, and can transmit contents being currently playing to the controllable device through the process of playing the contents.

After that, the portable terminal proceeds to step 303 and checks if the portable terminal senses drag-and-drop of the contents to a region to which a controllable device is registered.

If the portable terminal determines in step 303 that the drag-and-drop of the contents is not sensed, the portable terminal again performs a process of step 301.

In contrast, if the portable terminal determines in step 303 that the drag-and-drop of the contents is sensed, the portable terminal proceeds to step 305 and confirms a direction to which the drag-and-drop is sensed. Then, the portable terminal proceeds to step 306 and confirms location information of the portable terminal.

Next, the portable terminal proceeds to step 307 and detects the controllable device registered to the portable terminal, using the direction confirmed in step 305 and the location information of the portable terminal confirmed in step 306. Because the controllable device registered to the direction to which the drag-and-drop is sensed may be different according to location change of the portable terminal, prior to step 307, in step 306, the portable terminal detects the location information of the portable terminal.

At this time, the portable terminal checks if the controllable device has been registered to the confirmed direction and, when the controllable device has not been registered to the confirmed direction, the portable terminal again performs a process of step 303. Further, the portable terminal can provide information of the controllable device registered to the confirmed direction, to an output screen so that a user can check if drag-and-drop has been performed to a region to which the controllable device intended to be controlled is registered. Accordingly, when the drag-and-drop direction is wrong, the user of the portable terminal can again perform a process of drag-and-drop for the controllable device.

Next, the portable terminal proceeds to step 309 and checks if the registered controllable device is available.

If the portable terminal determines in step 309 that the registered controllable device is unavailable (i.e., is in a communication disable state), the portable terminal returns to step 301 and again performs an operation of selecting a controllable device.

In contrast, if the portable terminal determines in step 309 that the registered controllable device is available (i.e., is in a communication enable state), the portable terminal proceeds to step 311 and performs a process of contents control for the registered controllable device. At this time, the portable terminal can move or copy the contents, which are being output in step 301, to the registered controllable device so that the contents can play in the registered controllable device.

Next, the portable terminal terminates an algorithm according to the present disclosure.

Figure 4:
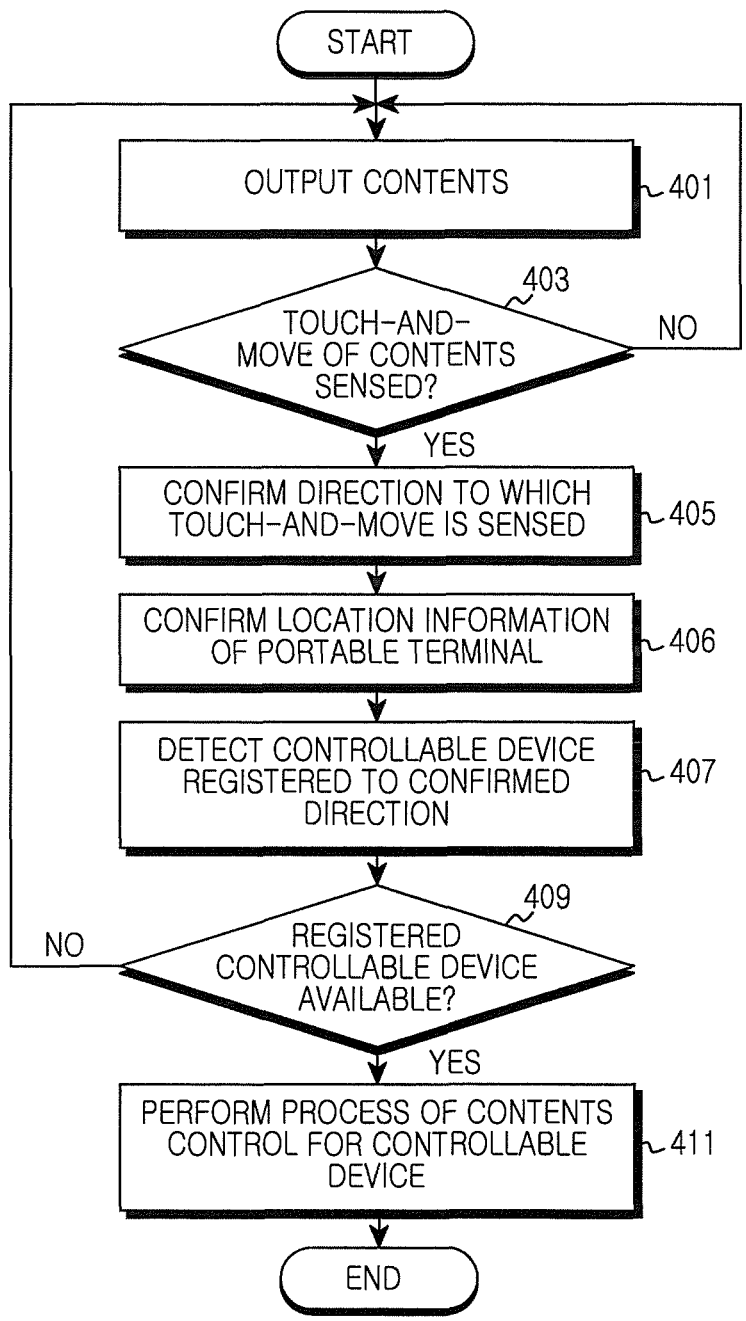
FIG. 4 illustrates a flowchart of a process of controlling a pre-registered controllable device in a portable terminal according to another desirable exemplary embodiment of the present disclosure.

FIG. 4 illustrates a flowchart of a process of controlling a pre-registered controllable device in a portable terminal according to another desirable exemplary embodiment of the present disclosure.

The portable terminal can sense a user's input capable of determining direction or a touch input instruction and control a pre-registered controllable device. In FIG. 4, a description is made for a process of sensing touch-and-move of contents among user's inputs and controlling a pre-registered controllable device. Here, the touch-and-move of the contents refers to a user's input of throwing or flicking contents to a region to which a controllable device is registered.

First, in step 401, the portable terminal performs a process of outputting contents.

Here, the process of outputting the contents can include a process of outputting a list of contents that will be provided from a portable terminal to a controllable device and a process of playing the contents that will be provided to the controllable device.

After that, the portable terminal proceeds to step 403 and checks if the portable terminal senses touch-and-move of the contents to a region to which a controllable device is registered.

If the portable terminal determines in step 403 that the touch-and-move of the contents is not sensed, the portable terminal again performs a process of step 401.

In contrast, if the portable terminal determines in step 403 that the touch-and-move of the contents is sensed, the portable terminal proceeds to step 405 and confirms a direction to which the touch-and-move is sensed. Then, the portable terminal proceeds to step 406 and confirms location information of the portable terminal.

Next, the portable terminal proceeds to step 407 and detects the controllable device registered to the portable terminal, using the direction confirmed in step 405 and the location information of the portable terminal confirmed in step 406. At this time, the portable terminal checks if the controllable device has been registered to the confirmed direction and, when the controllable device has not been registered to the confirmed direction, the portable terminal again performs a process of step 403. Further, the portable terminal can provide information of the controllable device registered to the confirmed direction, to an output screen so that a user can check if the controllable device is a controllable device intended to be controlled.

Next, the portable terminal proceeds to step 409 and checks if the registered controllable device is available.

If the portable terminal determines in step 409 that the registered controllable device is unavailable (i.e., is in a communication disable state), the portable terminal performs a process of step 401.

In contrast, if the portable terminal determines in step 409 that the registered controllable device is available (i.e., is in a communication enable state), the portable terminal proceeds to step 411 and performs a process of contents control for the registered controllable device. At this time, the portable terminal can move or copy the contents, which are being output in step 401, to the registered controllable device so that the contents can play in the registered controllable device.

Next, the portable terminal terminates an algorithm according to the present disclosure.

Figure 5:
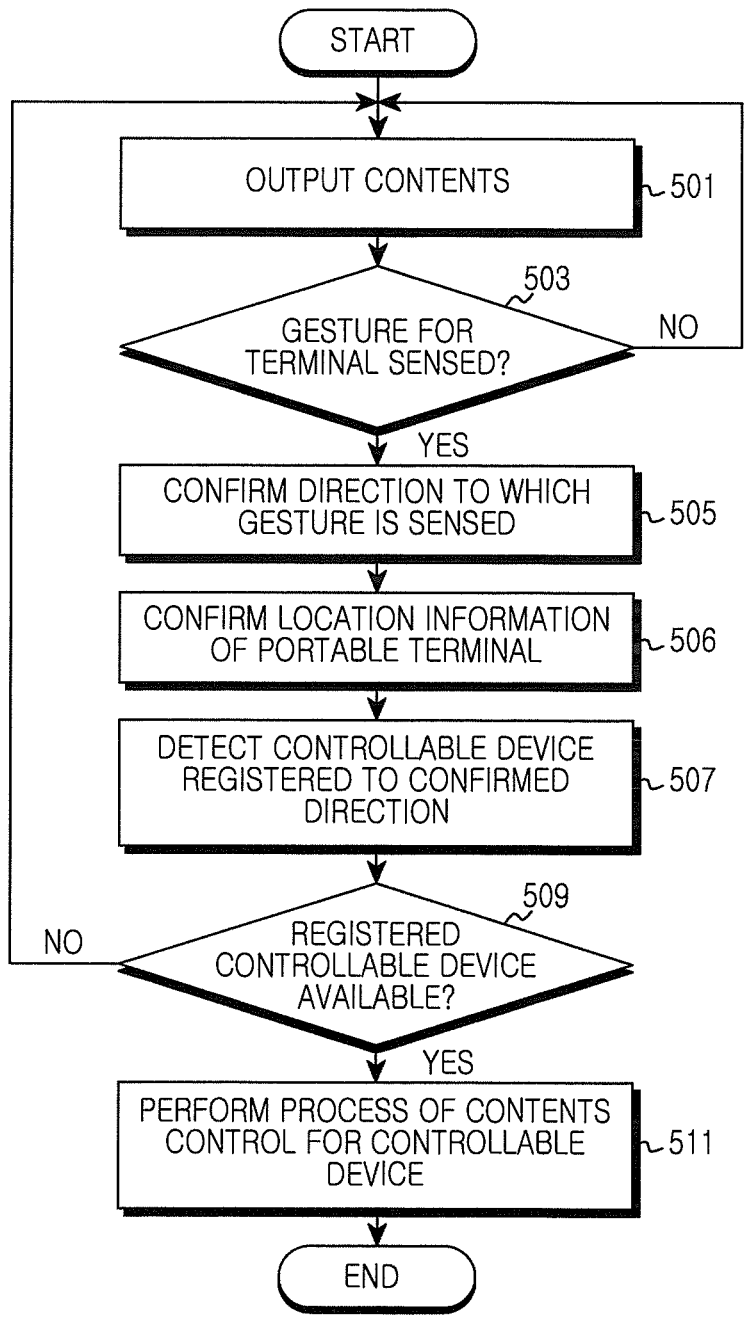
FIG. 5 illustrates a flowchart of a process of controlling a pre-registered controllable device in a portable terminal according to a further desirable exemplary embodiment of the present disclosure.

FIG. 5 illustrates a flowchart of a process of controlling a pre-registered controllable device in a portable terminal according to a further desirable exemplary embodiment of the present disclosure.

The portable terminal can sense a user's input capable of determining direction or a touch input instruction and control a pre-registered controllable device. In FIG. 5, a description is made for a process of sensing a user's gesture of moving the portable terminal among user's inputs and controlling a pre-registered controllable device. Here, the user's gesture can be moving the portable terminal held in hand to at least any one of up, down, left, right, and diagonal directions.

First, in step 501, the portable terminal performs a process of outputting contents.

Here, the process of outputting the contents can include, as aforementioned, a process of outputting a list of contents that will be provided from a portable terminal to a controllable device and a process of playing the contents that will be provided to the controllable device.

After that, the portable terminal proceeds to step 503 and checks if the portable terminal senses a gesture for contents to a region to which a controllable device is registered.

If the portable terminal determines in step 503 that the gesture for contents is not sensed, the portable terminal again performs a process of step 501.

In contrast, if the portable terminal determines in step 503 that the gesture for contents is sensed, the portable terminal proceeds to step 505 and confirms a direction to which the gesture is sensed. Then, the portable terminal proceeds to step 506 and confirms location information of the portable terminal.

Next, the portable terminal proceeds to step 507 and detects the controllable device registered to the portable terminal, using the direction confirmed in step 505 and the location information of the portable terminal confirmed in step 506. At this time, the portable terminal checks if the controllable device has been registered to the confirmed direction and, when the controllable device has not been registered to the confirmed direction, the portable terminal again performs a process of step 503. Further, the portable terminal can provide information of the controllable device registered to the confirmed direction, to an output screen so that a user can check if the controllable device is a controllable device intended to be controlled.

Next, the portable terminal proceeds to step 509 and checks if the registered controllable device is available.

If the portable terminal determines in step 509 that the registered controllable device is unavailable (i.e., is in a communication disable state), the portable terminal performs a process of step 501.

In contrast, if the portable terminal determines in step 509 that the registered controllable device is available (i.e., is in a communication enable state), the portable terminal proceeds to step 511 and performs a process of contents control for the registered controllable device. At this time, the portable terminal can move or copy the contents, which are being output in step 501, to the registered controllable device so that the contents can play in the registered controllable device.

Next, the portable terminal terminates an algorithm according to the present disclosure.

Figure 6:
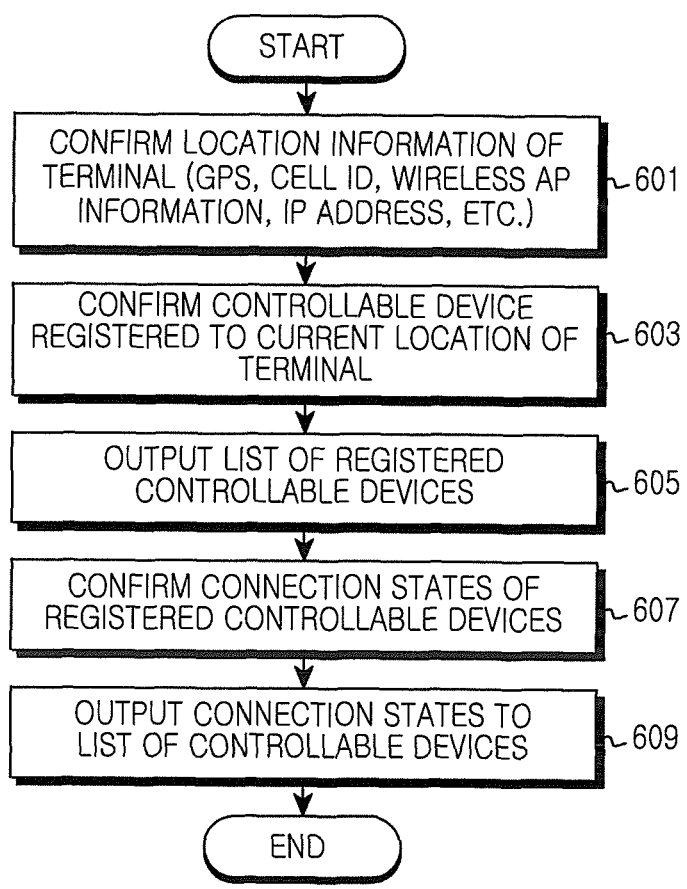
FIG. 6 illustrates a flowchart of a process of detecting a pre-registered controllable device in a portable terminal according to a desirable exemplary embodiment of the present disclosure.

FIG. 6 illustrates a flowchart of a process of detecting a pre-registered controllable device in a portable terminal according to a desirable exemplary embodiment of the present disclosure.

Referring to FIG. 6, the portable terminal can register controllable devices to partial regions of an output screen as in FIG. 2. At this time, after registering different controllable devices to different regions, the portable terminal can control a controllable device corresponding to a direction to which a user's input capable of determining direction is sensed.

Further, the portable terminal distinguishes locations and registers controllable devices. The portable terminal can change the registered controllable devices according to location change of the portable terminal.

First, in step 601, the portable terminal detects a current location of the portable terminal. Here, the portable terminal detects pre-registered controllable devices in the current location, and confirms location information such as GPS information (i.e., latitude and longitude information), cell information (i.e., a cell ID), wireless AP information, a network address (i.e., an IP address) and the like.

After that, the portable terminal proceeds to step 603 and confirms controllable devices registered to the current location of the portable terminal. Then, the portable terminal proceeds to step 605 and outputs a list of the registered controllable devices. At this time, at the time of controllable device registration, the portable terminal registers even current location information of the portable terminal together as in Table 1 below, so the portable terminal can confirm controllable devices corresponding to the location information.

TABLE 1

| Controllable device | Register region | Location information |
|---|---|---|
| PC 1 | Up | A |
| Printer 1 | Down | A |
| TV | Up | B |
| PC 2 | Down | B |

That is, when moving to spot 'A', the portable terminal can output a list of controllable devices that lists the PC 1 registered to an up side of an output region and the Printer 1 registered to a down side thereof. Further, when moving to spot B', the portable terminal can output a list of controllable devices that lists the TV registered to the up side of the output region and the PC 2 registered to the down side thereof. That is, different controllable devices have been registered to the up and down sides of the output region, and the portable terminal can output a list of controllable devices corresponding to a current location of the portable terminal using location information.

Next, the portable terminal proceeds to step 607 and confirms connection states of the registered controllable devices. Then, the portable terminal proceeds to step 609 and processes to output the use or non-use of the registered controllable devices on the list of controllable devices.

Owing to this, although a user sets a controllable device register region differently according to an office, a house, and an external environment using a mobile communication network, a portable terminal can provide information of a controllable device that a user has registered on a basis of a current location, using location information.

After that, the portable terminal terminates an algorithm according to the present disclosure.

FIGS. 7A-C illustrate a diagram of a process of registering a controllable device in a portable terminal according to a desirable exemplary embodiment of the present disclosure.

Referring to FIGS. 7A-C, the portable terminal can allot parts of an output screen as controllable device register regions as illustrated by reference symbol (a).

For example, the portable terminal can allot up, down, left, and right regions (701-1, . . . , 701-4) of the output screen as controllable device register regions. Or, the portable terminal can allot corner regions (703-1, . . . , 703-4) of the output screen as controllable device register regions.

The portable terminal intending to register a controllable device searches for connectable peripheral devices and then, outputs a list of the searched peripheral devices as illustrated by reference symbol (b).

At this time, the portable terminal can sense a user's input and register a controllable device to a register region. For one example, when sensing a user's input (705) of selecting and moving a printer item to an up side, the portable terminal can register a controllable device 'printer' to an up region.

Further, when sensing a user's input (707) of selecting and moving a Digital TeleVision (DTV) item to a left side, the portable terminal can register a controllable device 'DTV' to a left region.

Further, when sensing a user's input (709) of selecting and moving a PC item to a right side, the portable terminal can register a controllable device 'PC' to a right region.

Further, when sensing a user's input (711) of selecting and moving a cloud service item to a down side, the portable terminal can register a 'cloud service' to a down region.

If registering the controllable devices to respective directions using the above method, the portable terminal can store information about the controllable devices registered to up, down, left, and right sides as illustrated by reference symbol (c).

Figure 8A:
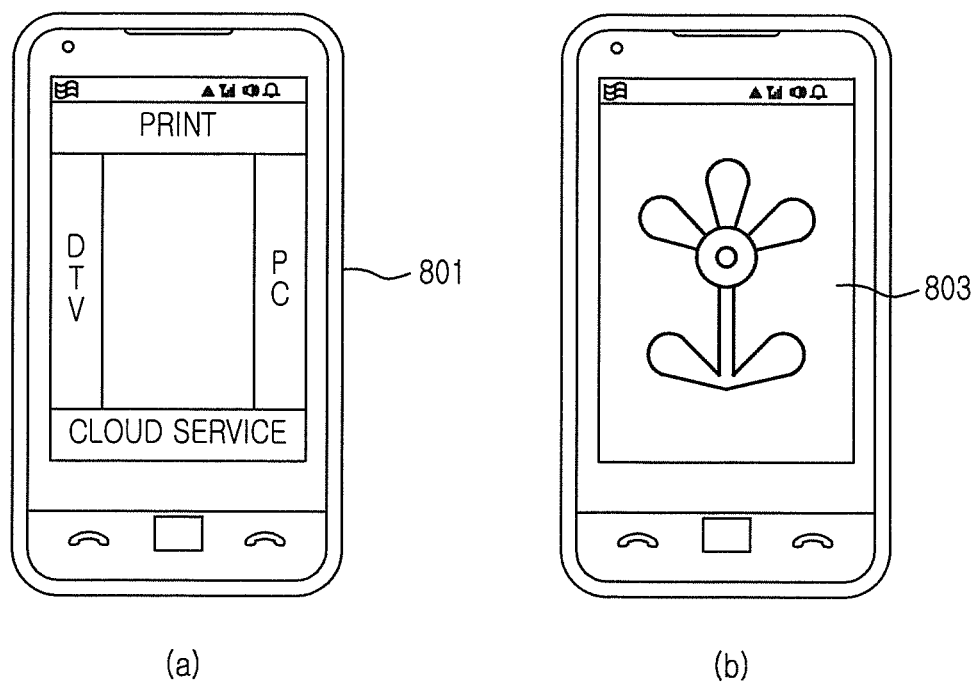
FIGS. 8A-B illustrate a process of controlling a controllable device in a portable terminal according to a desirable exemplary embodiment of the present disclosure.
Figure 8B:
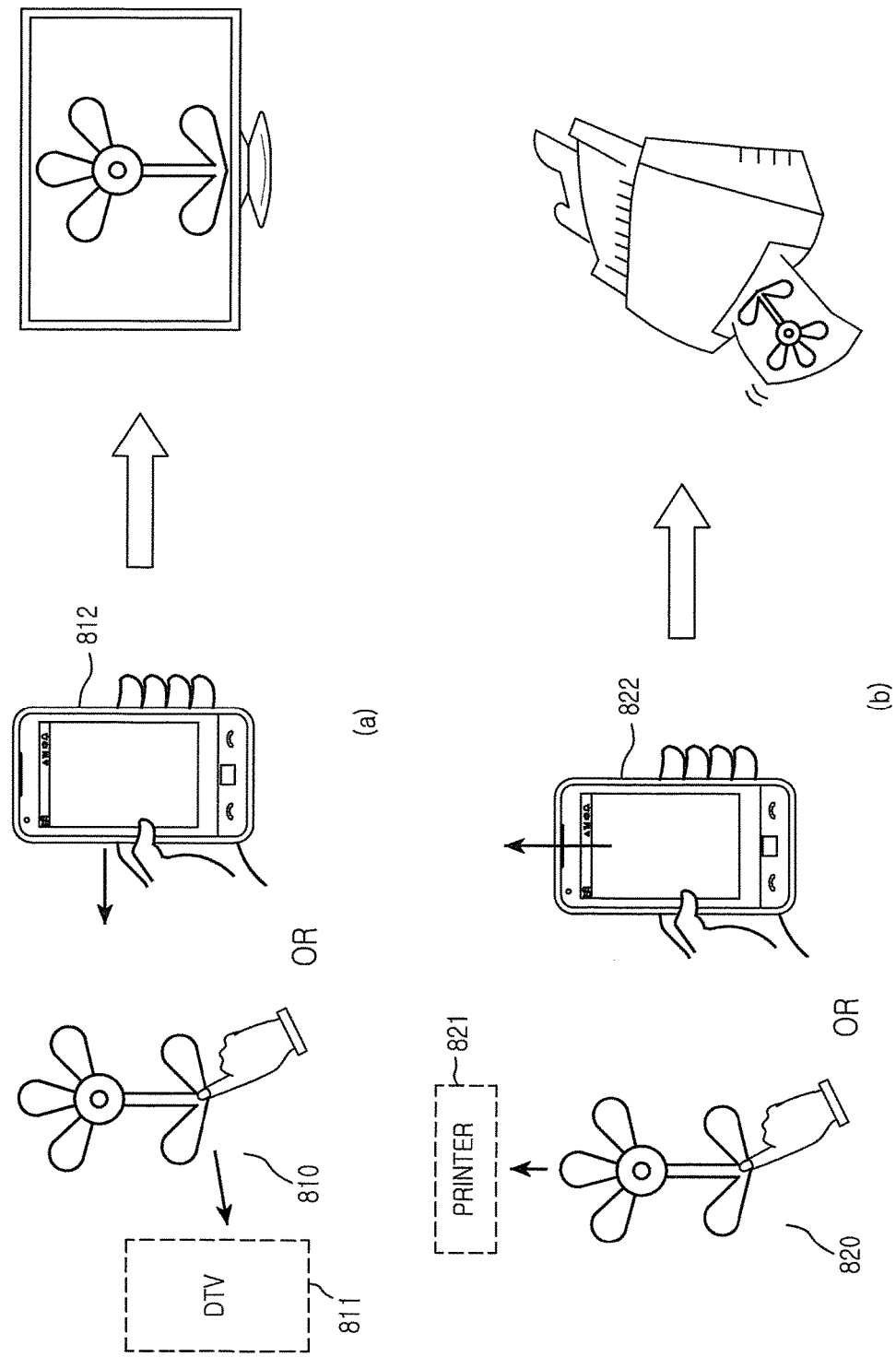

FIGS. 8A-B illustrate a process of controlling a controllable device in a portable terminal according to a desirable exemplary embodiment of the present disclosure.

FIG. 8A illustrates a process of playing contents in a portable terminal according to a desirable exemplary embodiment of the present disclosure.

Referring to FIG. 8A, the portable terminal has registered (801) a plurality of controllable devices to parts of an output screen as denoted by reference symbol (a). At this time, the portable terminal can provide (803) a pre-registered controllable device (e.g., a cloud service) with contents being playing or contents stored in the portable terminal as denoted by reference symbol (b).

FIG. 8B illustrates a process of transmitting contents to a pre-registered controllable device in a portable terminal according to a desirable exemplary embodiment of the present disclosure.

The portable terminal is in a state of, as illustrated in FIG. 8A, registering a DTV to a left region of an output screen and registering a printer to an up region thereof.

Referring to FIG. 8B, a user of the portable terminal has recognized regions to which controllable devices are registered. At this time, the user can transmit contents to a controllable device through a gesture of moving contents being playing to a direction to which the controllable device intended to be controlled is registered or shaking the portable terminal to the direction to which the controllable device is registered.

That is, to play contents in a DTV as denoted by reference symbol (a), the user of the portable terminal moves (810) contents being playing to a left region 811 to which a DTV is registered or moves (812) the portable terminal to a left direction. At this time, the portable terminal can sense a user's input and detect that a controllable device registered to the left direction is the DTV. After that, the portable terminal checks if a communication state of the pre-registered DTV is a connectable state.

When the pre-registered DTV is in the connectable state, the portable terminal transmits the contents being currently playing to the DTV, and the DTV plays the received contents.

Also, to output contents through a printer as denoted by reference symbol (b), the user of the portable terminal moves (820) contents being playing to an up region 821 to which the printer is registered or moves (822) the portable terminal to an up direction. At this time, the portable terminal can sense a user's input and detect that a controllable device registered to the up direction is the printer. After that, the portable terminal checks if a communication state of the pre-registered printer is a connectable state.

When the pre-registered printer is in the connectable state, the portable terminal transmits contents being currently playing to the printer, and the printer outputs the received contents.

Further, when sensing a user's input, the portable terminal can output information of a controllable device corresponding to the user's input. When a communication state of the controllable device corresponding to the user's input is a non-connectable state, the portable terminal can output information representing that the controllable device is not working.

Figure 9C:
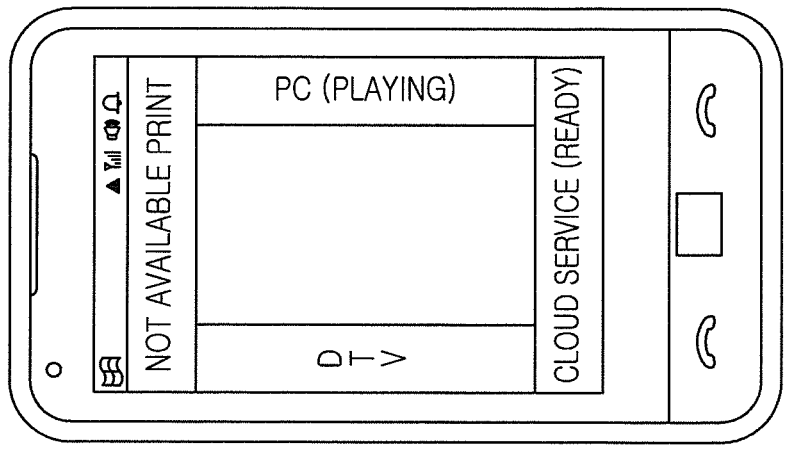
FIGS. 9A-C illustrate a process of outputting information of a pre-registered controllable device in a portable terminal according to the present disclosure.
Figure 9B:
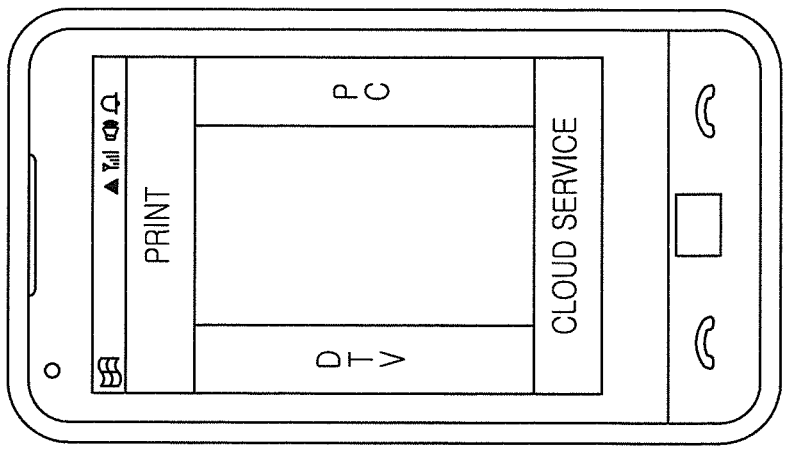
Figure 9A:
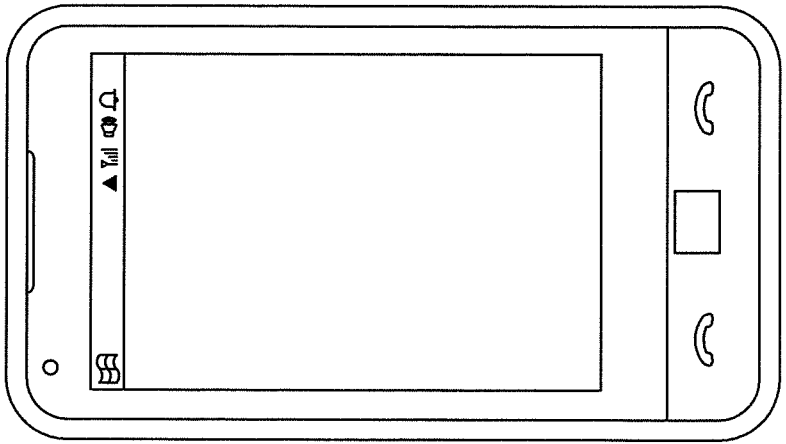

FIGS. 9A-C illustrate a process of outputting information of a pre-registered controllable device in a portable terminal according to the present disclosure.

Referring to FIGS. 9A-C, the portable terminal registers controllable devices to parts of an output screen according to a user's request, but may not output, as denoted by reference symbol (a), information about the registered controllable devices.

However, when a user's input is sensed like as playing contents are selected, the portable terminal can output, as denoted by reference symbol (b), regions to which controllable devices are registered. That is, as illustrated, the portable terminal can output that a 'printer' has been registered to an up side of an output screen, a 'DTV' to a left side thereof, a 'PC' to a right side thereof, and a 'cloud service' to a down side thereof.

Further, the portable terminal can output even a communication state of the registered controllable device together, as denoted by reference symbol (c). That is, as illustrated, the portable terminal can output that the 'printer' and 'DTV' are not available, the 'cloud service' is ready, and the 'PC' is currently playing contents. As illustrated, not-available information represents that a corresponding controllable device is not searched in a network, playing information represents that contents are currently running, and ready information represents that a corresponding controllable device is in a ready state.

Methods according to exemplary embodiments disclosed in claims and/or a specification of the present disclosure can be implemented in hardware, software, or a form of a combination thereof.

In embodiments of the present disclosure implemented in software, a computer readable storage medium storing one or more programs (i.e., software modules) can be provided. One or more programs stored in the computer readable storage medium are configured to be executable by one or more processors within an electronic device such as a portable terminal. One or more programs include instructions for enabling an electronic device to execute the methods according to the exemplary embodiments disclosed in the claims and/or the specification of the present disclosure.

These programs (i.e., software modules or software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, they can be stored in a memory constructed in a combination of some or all of them. Also, each construction memory may be included in plural.

Further, the programs can be stored in a storage device attachable to an electronic device and accessible through a communication network such as the Internet, an intranet, a Local Area Network (LAN), a Wireless LAN (WLAN), or a Storage Area Network (SAN), or a communication network configured in a combination of them. This storage device can access the electronic device through an external port.

Furthermore, a separate storage device on a communication network may access a portable electronic device.

For one instance, a module of an electronic device, which includes one or more processors, a memory, and one or more modules stored in the memory and configured to be executed by the one or more processors, can include instructions of registering controllable devices to partial regions of an output screen, sensing a user's input capable of determining direction, detecting a controllable device corresponding to the user's input, and transmitting contents to the detected controllable device.

Further, the module of the electronic device can include instructions of searching for controllable devices, outputting a list of the searched controllable devices, allotting a controllable device register region that will register a controllable device in an output screen, and registering the controllable device to the controllable device register region.

Further, the module of the electronic device can include instructions of, after registering a controllable device, acquiring and storing location information about a spot having registered the controllable device.

Further, the module of the electronic device can include an instruction of, when sensing a user's input, outputting a list of registered controllable devices.

Further, the module of the electronic device can include instructions of acquiring location information of a portable terminal, and detecting a controllable device corresponding to the location information of the portable terminal.

Further, the module of the electronic device can include instructions of detecting a communication state of a controllable device, and outputting the communication state of the controllable device.

As described above, exemplary embodiments of the present disclosure have an advantage of transmitting contents being playing to a controllable device in a portable terminal. The exemplary embodiments of the present disclosure have an advantage of, after registering controllable devices onto an output screen, being capable of easily detecting contents to be transmitted and a controllable device, by a user's input capable of determining direction.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A device for controlling a controllable device, the device comprising:
an input device configured to receive input data associated with a first user input and a second user input;
a memory unit configured to store information of the controllable devices; and
a controller configured to:
responsive to receiving the first user input:
determine, based on a direction corresponding to first input data associated with the first user input received by the input device, a configuration region of an output screen to register controllable devices;
register a first controllable device among the controllable devices corresponding to the determined configuration region of the output screen; and
responsive to receiving the second user input on the output screen while content is being played:
determine, based on a direction corresponding to second input data associated with the second user input, a region of the output screen,
determine a controllable device corresponding to the region of the output screen; and
control the determined controllable device to play the content.

2. The device of claim 1, wherein the controller is configured to display an indicator for representing regions to which the controllable devices are registered.

3. The device of claim 1, wherein, in response to registering the controllable devices, the controller is configured to acquire and store location information about the regions associated with the registered controllable devices.

4. The device of claim 1, wherein, in response to outputting the content, the controller is configured to output a list of the registered controllable devices.

5. The device of claim 1, wherein, in response to sensing the second user input, the controller is configured to acquire location information of the device and determine the controllable device corresponding to the location information.

6. The device of claim 1, wherein, in response to outputting the content, the controller is configured to detect communication states of the registered controllable devices and output the communication states of the registered controllable devices.

7. The device of claim 1, wherein the second user input comprises at least one of a drag-and-drop of contents, a flick of contents, and a gesture of a user holding the device.

8. A method for controlling a controllable device in a portable terminal, the method comprising:
in response to receiving a first user input:
determining, based on a direction corresponding to first input data associated with the first user input, a configuration region of an output screen to register the controllable devices; and
registering a controllable device among the controllable devices to the determined configuration region of the output screen;
in response to receiving a second user input on the output screen while a content is being played:
determining, based on a direction corresponding to second input data associated with the second user input, a region of the output screen;
determining a controllable device corresponding to the region of the output screen; and
controlling the determined controllable device to play the content.

9. The method of claim 8, wherein outputting the content comprises displaying an indicator for representing to which the controllable devices are registered.

10. The method of claim 8, wherein registering the controllable devices to the regions of the output screen comprises:
in response to registering the controllable devices, acquiring and storing location information about the regions associated with the registered controllable devices.

11. The method of claim 8, wherein the region of the output screen comprises:
in response to outputting the content, outputting a list of the registered controllable devices.

12. The method of claim 8, wherein determining the controllable device corresponding to the region of the output screen comprises:
in response to sensing the second user input, acquiring location information of the portable terminal; and
determining the controllable device corresponding to the location information of the portable terminal.

13. The method of claim 8, wherein determining the region of the output screen comprises:
in response to outputting the content, detecting communication states of the registered controllable devices; and
outputting the communication states of the registered controllable devices.

14. The method of claim 8, wherein the second user input comprises at least one of a drag-and-drop of contents, a flick of contents, and a gesture of a user holding the portable terminal.

15. An electronic device comprising:
one or more processors configured to execute instructions of a computer program;
a memory configured to store data and instructions; and
one or more modules stored in the memory and constructed to be executed by the one or more processors,
wherein the one or more modules comprises instructions for:
  displaying a list of controllable devices;
  receiving selections of regions of an output screen to register the controllable devices;
  registering the controllable devices to the regions of the output screen according to the selections,
  detecting a direction corresponding to a user input,
  detecting a controllable device corresponding to the directions, and
  controlling the detected controllable device to play content.

16. The electronic device of claim 15, wherein the instructions for registering the controllable devices to the regions of the output screen comprise instructions for:
  allocating controllable device register regions where the controllable devices will be registered in the output screen; and
  registering the controllable devices to the controllable device register regions.

17. The electronic device of claim 15, wherein the instructions for registering the controllable devices to the regions of the output screen comprise instructions for:
  in response to registering the controllable devices, acquiring and storing location information about the regions associated with the registered controllable devices.

18. The electronic device of claim 15, wherein the instructions for detecting the direction corresponding to the user input comprise instructions for:
  in response to sensing the user input, outputting the list of the registered controllable devices.

19. The electronic device of claim 15, wherein the instructions for detecting the controllable device corresponding to the direction comprise instructions for:
  acquiring location information of the device; and
  detecting controllable devices corresponding to the location information of the device.

20. The electronic device of claim 15, wherein the instructions for detecting the controllable device corresponding to the direction comprise instructions for:
  detecting communication states of the controllable devices; and
  outputting the communication states of the controllable devices.

* * * * *